Patented Mar. 2, 1926.

1,575,290

UNITED STATES PATENT OFFICE.

ALFRED TINGLE, OF OTTAWA, ONTARIO, CANADA.

METHOD OF MANUFACTURING A PULP PRODUCT.

No Drawing.   Application filed September 24, 1921.   Serial No. 503,044.

*To all whom it may concern:*

Be it known that I, ALFRED TINGLE, a subject of the King of Great Britain, and resident of the city of Ottawa, in the Province of Ontario and Dominion of Canada, have invented certain new and useful Improvements in Methods of Manufacturing a Pulp Product, of which the following is a specification.

This invention relates to an improved method of manufacturing a pulp product, and the objects of the invention are to provide a method of manufacturing at low cost a pulp product having a relatively impermeable surface adapted to receive a coat of varnish or other covering material.

It is well known in the art to manufacture pressed pulp articles impregnated with a solution of a gum, or resin or a varnish to stiffen the same. In this instance, relatively large quantities of gum, resin or varnish are used and absorbed into the body of the pulp, producing a colouring undesirable for certain purposes, such, for example as the manufacture of pails for food products and being of relatively high cost.

I have discovered that, if a ligno-cellulose product such as a pressed pulp article is treated superficially with sulphuric acid, a surface product is formed which is relatively impermeable by varnish and the like and which will permit the application of varnish to the surface after removal of the acid and drying as hereinafter described.

The process may be applied to a variety of articles for a variety of purposes. It comprises in its main essentials, first, treating the article superficially with sulphuric acid of a suitable density, then neutralizing the sulphuric acid and washing the surface then drying the article and applying the first coating which may be varnish or the like. The length of time occupied in the superficial treatment of the sulphuric acid will depend somewhat on the strength of the acid. I have found that acid may be used of a strength comparable with that heretofore used in the art of manufacturing vegetable parchment by the treatment of a purely cellulose paper with sulphuric acid. The density used for this purpose ranges from 52° to 60° Bé. With the strong acid, the length of superficial treatment may be reduced. I find it more convenient to give this treatment by immersing the article in a tank containing the acid, and, for the purpose of illustration, will now describe the process in detail as applied, for instance, to the manufacture of a pressed pulp pail to be used for food products.

In practically carrying out this process, the pails are suitably formed from pulp fibre of a desired size and shape in a manner well known in the art. These are allowed to become relatively dry and then immersed in a tank containing sulphuric acid (say, 57°), the immersion preferably being for not less than one minute and not more than three minutes. The pail is then raised and allowed to drip for, say, one-half minute, and washed with running water for two minutes or more. The pail is then washed with weak ammonia (10% ammonia 26° Bé. and 90% water by volume), washing being carried on for a period of two minutes or more. The pail is then inserted in a stronger solution of ammonia (20% ammonia 26° Bé. and 80% water by volume) for five minutes or more, which pail may then be again washed in running water for three minutes or more.

The purpose of the ammonia and various washings is to remove the last trace of sulphuric acid and its salts from the surface of the article. After this has been accomplished the article is dried in a kiln at about 180° Fahrenheit.

It will be found in this condition the sulphuric acid has produced a relatively impermeable compound, the chemical constitution of which I am unable to state, but which renders the surface a light brown and relatively impermeable by varnish or other covering and of a parchmentized character. The article for some purposes might be used without a covering, but, when it is to be used as a pail for packing food products, it is dipped after drying in a varnish which is relatively impermeable by water and not acted upon by the food product to be packed. The varnish is then dried by heating the article in the manner well understood in the art.

It will appear from observation that the effect of the sulphuric acid is to produce a hydrated form of cellulose or ligno-cellulose on the surface of the article.

I am aware that it has long been proposed to manufacture vegetable parchment by treating a purely cellulose paper with sulphuric acid. The pulp acted upon by my process, however, is ligno-cellulose, and the surface compound produced is, therefore, considerably different.

In addition to this, it may be observed that the pulp is relatively thick and pressed to shape before being acted upon by the sulphuric acid.

As many changes could be made in the above process and many apparently widely different embodiments of my invention within the scope of the claims, constructed without departing from the spirit or scope thereof, it is intended that all matter contained in the accompanying specification shall be interpreted as illustrative and not in a limiting sense.

What I claim as my invention is:

1. The herein described method of treating a ligno-cellulose article with a relatively impermeable surface which comprises treating the article superficially only with sulphuric acid.

2. The herein described method of manufacturing a pulp product which comprises pressing the article to shape and then treating superficially only with sulphuric acid.

3. The herein described method of manufacturing a pulp product which comprises pressing the article to shape, then treating superficially only with sulphuric acid, then removing the acid, then drying.

4. The herein described method of manufacturing a pulp article wth a relatively impermeable surface which comprises treating a ligno-cellulose article superficially only with sulphuric acid, then removing the sulphuric acid and drying.

5. The herein described method of manufacturing a pulp article which comprises treating a ligno-cellulose article with a relatively impermeable surface superficially only with sulphuric acid, then neutralizing the sulphuric acid, then drying.

6. The herein described method of manufacturing a pulp product which comprises pressing the article to shape, then treating superficially only with sulphuric acid, then neutralizing the sulphuric acid, and then drying.

7. The herein described method of manufacturing a pulp article which comprises treating a ligno-cellulose article with a relatively impermeable surface superficially only with sulphuric acid, then neutralizing the sulphuric acid, then washing and then drying.

8. The herein described method of manufacturing a pulp article which comprises treating ligno-cellulose superficially only with sulphuric acid, then neutralizing the acid by applying ammonia in solutions successively increased in strength, then washing and then drying.

9. The herein described method of manufacturing a pulp product which comprises pressing the article to shape, then treating superficially only with sulphuric acid, then neutralizing the acid by applying ammonia in solutions successively increased in strength, then washing, and then drying.

In witness whereof I have hereunto set my hand.

ALFRED TINGLE.